(12) United States Patent
Mahapatra

(10) Patent No.: US 11,481,570 B2
(45) Date of Patent: Oct. 25, 2022

(54) ENTITY RESOLUTION FOR TEXT DESCRIPTIONS USING IMAGE COMPARISON

(71) Applicant: HULU, LLC, Santa Monica, CA (US)

(72) Inventor: Aninoy Mahapatra, Los Angeles, CA (US)

(73) Assignee: HULU, LLC, Santa Monica, CA (US)

(*) Notice: Subject to any disclaimer, the term of this patent is extended or adjusted under 35 U.S.C. 154(b) by 170 days.

(21) Appl. No.: 17/093,287

(22) Filed: Nov. 9, 2020

(65) Prior Publication Data

US 2022/0147759 A1    May 12, 2022

(51) Int. Cl.
*G06K 9/62*  (2022.01)
*G06V 40/16*  (2022.01)

(52) U.S. Cl.
CPC ......... *G06K 9/6215* (2013.01); *G06V 40/168* (2022.01)

(58) Field of Classification Search
CPC .. G06K 9/6215; G06V 40/168; G06V 30/418; G06V 2201/10
See application file for complete search history.

(56) References Cited

U.S. PATENT DOCUMENTS

| | | | |
|---|---|---|---|
| 10,074,200 B1* | 9/2018 | Yeturu | G06T 11/00 |
| 10,891,969 B2* | 1/2021 | Huang | G10L 15/144 |
| 2016/0335500 A1* | 11/2016 | Popelo | G10L 25/51 |

* cited by examiner

*Primary Examiner* — Phuoc Tran
(74) *Attorney, Agent, or Firm* — Kwan & Olynick LLP

(57) ABSTRACT

In some embodiments, a method receives a first textual description of content and converts the first textual description of content to a first image representation. The method compares a similarity between the first image representation and a second image representation for candidate metadata. The candidate metadata is associated with a second textual description of content. The method determines whether the first textual description of content is associated with the second textual description of content based on the comparison of similarity of the first image representation and the second image representation.

20 Claims, 11 Drawing Sheets

300

```
{
    302                      304
    "descriptions": {
        "en" "In this uplifting drama based on the memoir, actor #1
        accepts a teaching position on an isolated island in a state."
    },
    "credits": [],
    "actors": [],
    "premiere": "1974-03-27T12:00:002Z",
    "genres": [
        {"id": "447b5cc2", "name": "Documentaries" },
        {"id": "1c3071f6", "name": "Drama"}
    ]
    "name": "Name #1",
    "ratings": []
    "directors": [],
    "id": "5a36a745",
    "hosts": [],
    "created_at": "2016-06-14T22:29:16+00:00",
    "duration": 6420,
    "awards": [],
    "releases": [],
    "data_tier": 1,
    "updated_at": "2020-07-12T10:00:21+00:00",
    "names": {"en": "Name #1" },
    "entity_type": "movie",
}
```

FIG. 3A

ENTITY RESOLUTION FOR TEXT DESCRIPTIONS USING IMAGE COMPARISON

BACKGROUND

A service provider may receive instances of metadata from content providers. For example, the metadata may describe content, which may be a video (e.g., a movie or a show). It is possible that multiple instances of metadata may refer to the same entity. An entity may be used to identify content in a database. The service provider would like to resolve the multiple instances of metadata to the same entity when the instances of metadata refer to the same content.

The entity resolution process may be complicated and not straightforward because the metadata may be received from different content providers in different formats and not always provide a clear identification of the entity. Also, a service provider may want to automate the entity resolution process. In some examples, a model may be used to analyze text from the instances of metadata. However, the amount of text and the variations of the text that can be received in the metadata is very large. Accordingly, the model may need to be trained using a supervised method that requires a large amount of training data, which may not be available. Also, any training data may be sparse and cannot fully train the model to recognize the variations in text that are possible. Accordingly, the service provider may not be able to train the model to accurately resolve metadata to the correct entity.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3A depicts an example of content metadata in a first structure according to some embodiments.

DETAILED DESCRIPTION

Figure 1:
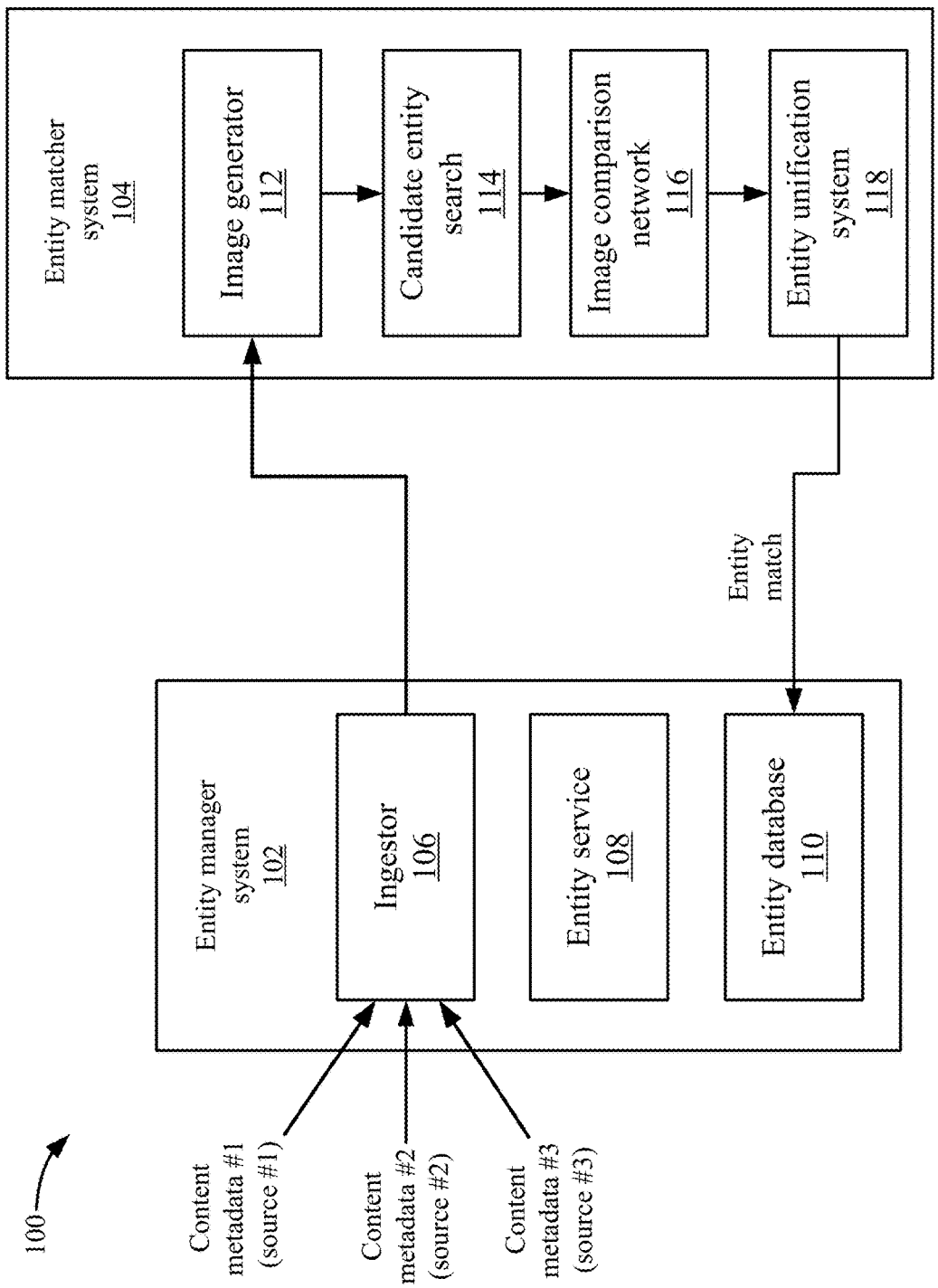
FIG. 1 depicts a system for analyzing content metadata according to some embodiments.

Described herein are techniques for a data analysis system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system receives multiple instances of content metadata that describe content. The content metadata may be any type of information, such as textual information, images, etc., and may be received from multiple sources. The system may convert the content metadata into a unified format, which may transform the content metadata from a format used by the source to a format used by the system. Then, the system may extract information from the content metadata that it uses to generate an image. For example, the system may transform information from fields in the content metadata into representations (e.g., vectors). The system may combine the representations from the fields to form an image. The image may be generated in different formats, such as grayscale, color, etc. Accordingly, a metadata image is generated from the content metadata.

In some embodiments, the system uses a prediction network that compares the images to perform entity resolution, which may resolve an instance of content metadata to an instance of candidate metadata. The candidate metadata may be associated with an entity of content. For example, the prediction network may generate encodings of a first image from the content metadata and a second image from the candidate metadata, and determine a similarity score that rates the similarity of the images. If the similarity score indicates the images are more likely to be similar, then the system may determine that the associated content metadata and candidate metadata correspond to the same entity. Accordingly, the prediction network may use facial recognition processing of metadata images to determine whether the textual information for the content metadata and candidate metadata is associated with the same entity.

Using a prediction network that analyzes images may have advantages over using a prediction network that compares textual information. For example, a prediction network that compares images may be more accurate than a prediction network that compares text. Comparing the similarity in text may miss a large amount of cases. To compensate, manual processes (e.g., heuristics or algorithms) may need to be added during the training stage. However, comparing content metadata from different sources as images may not require the manual processes, but rather the prediction network can be trained accurately based on the training data supplied to train the model.

Performing accurate entity resolution may be important to a service provider. If entities include metadata that is incorrectly resolved, then problems with services performed by the service provider may result. For example, if content metadata is resolved to the wrong entity, the service provider may incorrectly play back content, incorrectly record content, or incorrectly indicate whether content is unavailable or available to play/watch.

System Overview

FIG. 1 depicts a system 100 for analyzing content metadata according to some embodiments. System 100 includes an entity manager system 102 and an entity matcher system 104. Entity manager system 102 and entity matcher system 104 may be implemented using one or more computing devices. It is noted that functions described for entity manager system 102 and entity matcher system 104 may be distributed among computing devices and also among each system.

An ingestor 106 may receive multiple instances of content metadata. Metadata may be information that describes content. For example, content metadata may include textual information that may describe the content in words, such as the content metadata may be a description of a movie or episode of a show. The instances of content metadata may be received from multiple sources, which may be different content providers or other types of sources. A source may be from an original provider of the content metadata. Also, instances of content metadata may be received from the same source; e.g., the same source may send multiple instances of content metadata for the same content. As shown, content metadata #1 is received from a content source #1, content metadata #2 is received from a content source #2, and content metadata #3 is received from a content source #3. However, the content metadata may be received from the same source, such as that all instances of content metadata are received from content source #1.

Ingestor 106 ingests the content metadata. In some examples, ingestor 106 may transform the metadata into a format that is used by entity matcher system 104. For example, ingestor 106 may perform metadata transformations that convert the content metadata into a standard format. The transformations will be described in more detail below. It is noted that ingestor 106 may not perform any transformations on the content metadata. However, the transformation may be performed to convert information that may be received in different formats to a standard format.

An image generator 112 in entity matcher system 104 generates images from the content metadata. The features of the image reflect information from the text of the content metadata. For example, image generator 112 transforms information from an instance of the content metadata into an image representation. An image representation may comprise values that can be used to display an image. In some examples, image generator 112 transforms information from fields in the content metadata to a representation, such as a vector. This may generate multiple vectors for the fields. Then, image generator 112 generates an image from the vectors. In some embodiments, each vector may form a row of the image. The values of the vector may be used to generate the image, e.g., the values of the vector may be used to generate grayscale values of the image. Examples of images will be described below.

A candidate entity search 114 may determine candidate entities that can be compared to the content metadata that is received. An entity may be used to refer to an entity used by a video delivery service. For example, the entity may be associated with a video that may be requested for playback on the video delivery service. In some instances, the entity is a movie, show, episode of a show, etc. The entity is stored in an entity database 110 and is used to identify an instance of content. Candidate entities are entities to which the content metadata is compared to determine whether the content metadata is associated with one of the candidate entity—that is, whether the content metadata describes the same content (e.g., video) of one of the candidate entities. Then, entity matcher system 104 may determine whether a candidate entity exists in entity database 110 that is associated with the same content as an instance of content metadata. Although candidate entities are described, instances of content metadata may be compared together to determine if they are associated with the same entity.

The candidate entities are associated with candidate metadata. The candidate metadata may be information stored for the candidate entity in entity database 110. Each instance of candidate metadata may be associated with an image that is generated in a process that is similar to that described above for the content metadata. Thus, the instance of content metadata and the instance of candidate metadata are both associated with images.

An image comparison network 116 then compares the images. For example, image comparison network 116 compares the content metadata image to each of the candidate metadata images. Based on the comparison, image comparison network 116 outputs a prediction of similarity between the content metadata image to each of the candidate metadata images. For example, image comparison network 116 may output a similarity score that rates the similarity between a content metadata image and a candidate metadata image. A higher similarity score may indicate that the content metadata image and the candidate metadata image may be more likely to be associated with the same entity and a lower similarity score may indicate that the content metadata and the candidate metadata may be less likely to be associated with the same entity. Image comparison network 116 may use facial recognition to compare the content metadata image and the candidate metadata image, which is different from using natural language processing to analyze text for similarity. One difference is the facial recognition analyzes the features of an image instead of characteristics of text.

An entity unification system 118 may then determine whether the content metadata and the candidate metadata is associated with the same entity based on the similarity score. Entity matcher system 104 may perform multiple comparisons between the content metadata image and the candidate metadata images for multiple entities. Entity unification system 118 may determine a match using different methods. For example, entity unification system 118 may select the candidate metadata image with the highest similarity score. To ensure there is a high probability of a match, entity unification system 118 may compare the similarity scores to a threshold. If the threshold is met, entity unification system 118 determines that there is a match, and if the threshold is not met, entity unification system 118 determines that there is not a match. Entity unification system 118 uses a threshold in case there is not any candidate entities that are a good match, and all similarity scores are low.

If a match is found, entity unification system 118 may store text from content metadata with the entity for the candidate metadata that already exists in the entity database 110. If no matches are found, entity unification system 118 may instead store a new entity for the content metadata in entity database 110.

An entity service 108 may perform services based on metadata in entity database 110. For example, entity service 108 may process queries for entities. When a query is received for an entity, entity service 108 may search entity database 110 for applicable entities and provide search results. The search may be used to retrieve an entity for playback (e.g., a video), record an entity for a digital video recorder, or provide search results. Entity service 108 may also provide other services based on information in entity database 110. The quality of the services provided by entity service 108 may depend on accurate unification of content metadata with entities in entity database 110. For example, if content metadata for the same entity is unified in a single entity in entity database 110, entity service 108 can provide better search results for that entity. However, if multiple entries for the same entity exist, then the results may not be accurate or may be confusing.

Content Metadata Ingestion

Figure 2:
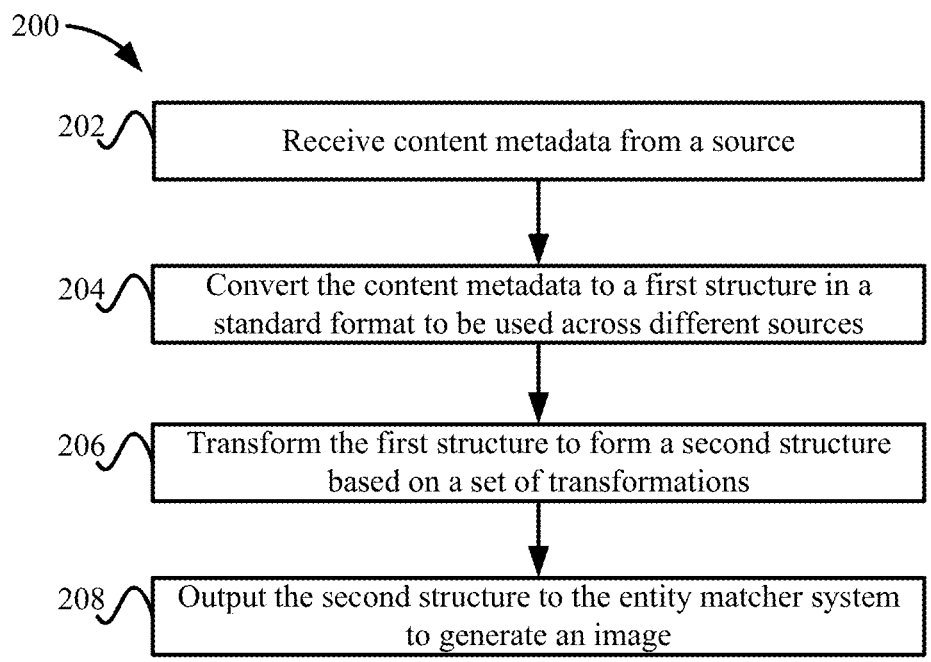
FIG. 2 depicts a simplified flowchart of a method for ingesting content metadata according to some embodiments.

FIG. 2 depicts a simplified flowchart 200 of a method for ingesting content metadata according to some embodiments. At 202, ingestor 106 receives content metadata from a source. The content metadata may be in a format that is generated by the source. To achieve some type of standardization, at 204, ingestor 106 may convert the content metadata to a first structure in a standard format that is used by system 100. Ingestor 106 and entity matcher system 104 may use the standard format rather than the format used by the source.

FIG. 3A depicts an example of content metadata in the first structure according to some embodiments. It is noted that formats other than the example shown in FIG. 3A may be used. In some examples, the content metadata may be received in a structured format, such as in extensible markup language (XML) files. The structure may list tags 302 and associated information 304. a field may refer to a tag 302 and associated information 304. Ingestor 106 may convert the files to another format (e.g., JavaScript Object Notation (JSON)) that is used by entity manager system 102. The conversion may not be necessary if the content metadata is received in the desired format or converted to the desired format before being received at ingestor 106. The content metadata may include tags 302 that are shown in quotes (e.g., "descriptions"). The tags 302 identify a type of metadata. For example, tags 302 may include "descriptions", "credits", "actors", and so on. Each tag 302 may have associated information, such as shown at 304 for the tag "descriptions". For example, the information for the "descriptions" tag describes the movie that is associated with the content metadata. Each tag may or may not include associated information. For example, some tags 302 may include "II", which means there is no associated information for this tag 302.

Figure 3B:
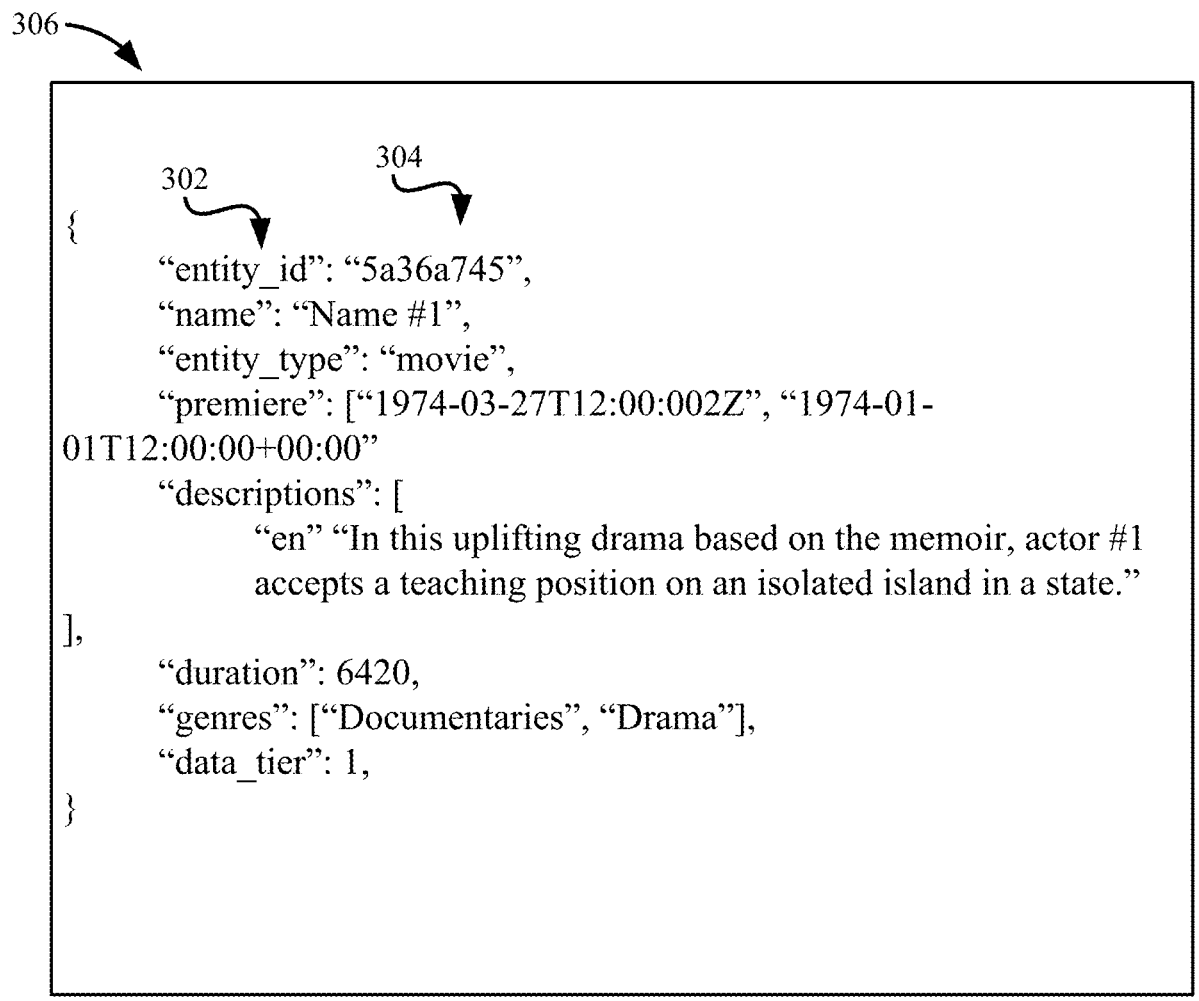
FIG. 3B depicts an example of information for a second structure of transformed content metadata according to some embodiments.

Referring back to FIG. 2, at 206, ingestor 106 transforms the first structure into a second structure based on a set of transformations. For example, ingestor 106 may have a specific list of tags 302 that are used to generate an image. Further, the associated information may be found in different tags 302 in the first structure. Ingestor 106 may want to extract information that is designated as being relevant for performing the entity resolution. In some embodiments, ingestor 106 may not need to transform the first structure into the second structure. However, the information in the second structure may be deemed to be the most useful for performing the entity resolution. In some cases, ingestor 106 may select fields that are relevant to perform the comparison with candidate entities. That is, the information for tags 302 may be important to the content metadata. FIG. 3B depicts an example of information for a second structure 306 according to some embodiments. For example, second structure 306 includes defined tags 302 of "entity id", "name", "entity_type", "descriptions", "year", "duration", "genres", and "data_tier". Other tags 302 may also be appreciated. The entity_id is an identifier for the instance of content metadata. The "name" tag 302 is the name of the content. The "entity_type" tag 302 is the type of content. The "premiere" tag 302 is the premiere date of the content. The "descriptions" tag is the description of the content. The "duration" tag 302 may be the length of the content. The "genres" tag 302 may be one or more genres of the content. The "data_tier" tag 302 may be an attribute that rates the quality of the data source, such as a tier 1 data source who is rated as providing good quality content metadata or tier 2 data source that is rated as providing lower quality content metadata. The above tags 302 may be changed per requirements.

Ingestor 106 may analyze tags 302 and associated information 304 in first structure 300 to generate second structure 306. For example, ingestor 106 may include rules that analyze first structure 300 to generate second structure 306. The "name" tag 302 in second structure 306 is taken from the information associated with the "name" tag 302 in first structure 300. Also, the "genres" tag 302 in second structure 306 uses the two entries from the "genres" tag 302 in first structure 300. Ingestor 106 may format the information from first structure 300 and add the formatted information to second structure 306. Further, ingestor 106 may create new tags 302 from information in first structure 300 if needed.

Referring back to FIG. 2, after generating the second structure 306 with the relevant tags 302 and information, at 208, ingestor 106 outputs the second structure to entity matcher system 104 to generate an image for the content metadata.

Image Generation

Figure 4:
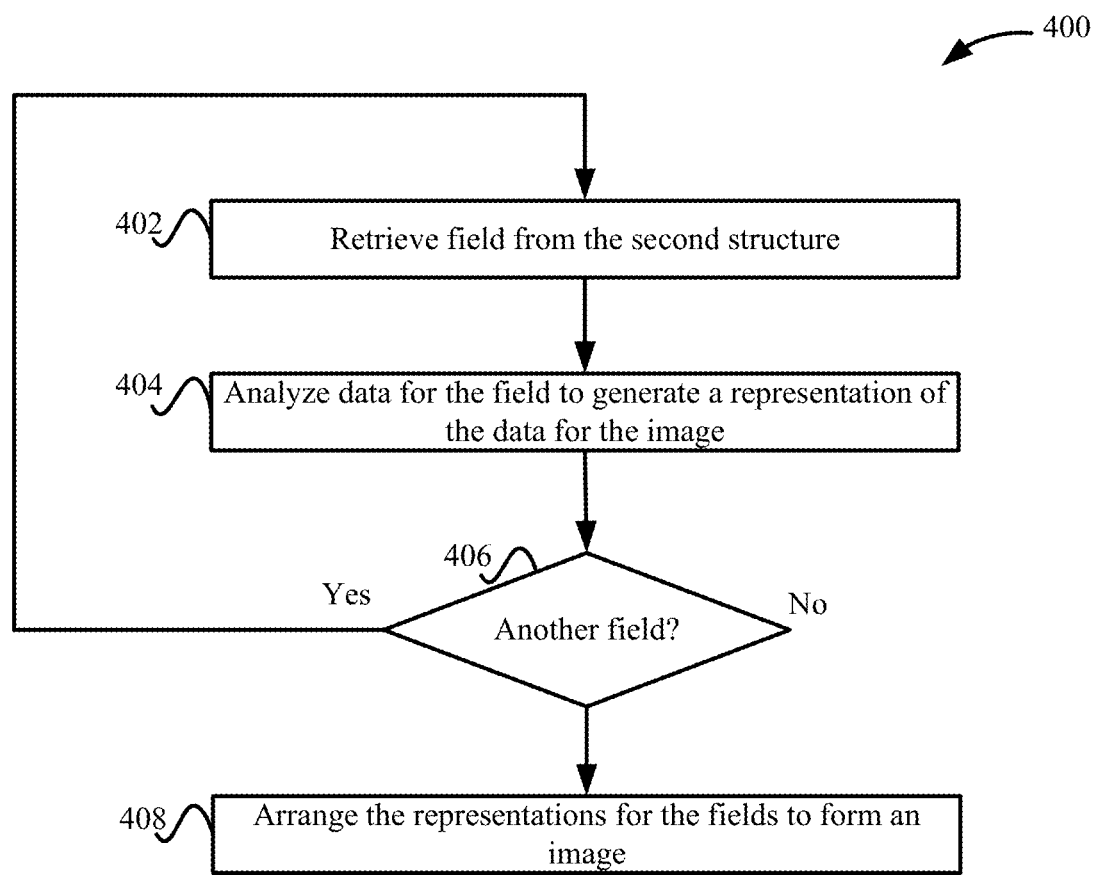
FIG. 4 depicts a simplified flowchart of a method for generating an image according to some embodiments.

Upon generating the second structure, ingestor 106 generates an image from the second structure. FIG. 4 depicts a simplified flowchart 400 of a method for generating an image according to some embodiments. Although the second structure is described, it will be understood that ingestor 106 may generate the image from the original content metadata or any other structure. At 402, image generator 112 retrieves a field from the second structure. The field may be associated with a tag and associated information. Although a field is described, it will be understood that a field does not need to be retrieved and any information may be processed. For example, if information is separated into portions, then each portion can be processed.

At 404, image generator 112 analyzes information for the field to generate a representation of the data for the image. Image generator 112 may generate the representation for the image in different ways. For example, image generator 112 may generate representations (e.g., vectors) for the individual field-based transformations. A vector may be a series of values of a certain dimension. Although a vector is described, other structures may be used, such as arrays. In some embodiments, the image is a specified size such as a length of 300 pixels and a height of 8 pixels. The height of the image may correspond to the number of fields that are used. For example, each row of the image may be associated with a field. For example, if eight fields are used, then the height of the image is 8 pixels. The length of the image is sufficient to capture the amount of information that is included in some fields. For example, some fields may include a large amount of text while some fields may include a small amount of text. The length of 300 pixels allows the fields with a large amount of text to be represented in the 300 pixels. An image taken by a camera or of a video may typically not be as long as 300 pixels with a height of 6 pixels. Typically, the ratio of height to width is a ratio of 1:1 or around 2:1. However, system 100 uses this image format because the images represent the text of the content metadata (and not a picture).

The following lists some transformations, but other transformations may be used. For the "descriptions" field, the description may be text that describes the content. Image generator 112 may combine the description into a paragraph and then generate a vector that is a 300-dimension vector. Any length of text may be converted into a standard 300-dimension vector.

For the "name" field, which may be the name of the content, image generator 112 may encode the name in 300 dimensions. In other embodiments, the name may be repeated to fit the 300 dimensions, if required. For example, the name may not be a long name (as compared to the description) and may be repeated or other information may be used to pad the vector to fit 300 dimensions. The name may be repeated such that the analysis of the similarity may review the name across the 300 dimensions instead of reviewing padded information that may not represent any information.

For the field "premiere", which may be the premiere date of the content, image generator 112 may parse the date text into a date/time structure and generate a vector for the date. Image generator 112 may repeat the values across the dimensions, if needed. The repeating provides redundancy and extra meaning to the values, which may be single integer values.

For the "entity type" and the "data tier" fields, image generator 112 converts the entity type and the data tier fields into a vector. In some embodiments, the entity type and data tier fields may be selected from a set of predefined values. For example, the data tier field may be the values of "1" or "2". The entity type may be the values of "episode", "movie", or "series". Although the above values are described, other methods may be used.

For the "genres" field, which may indicate the genre of the content, such as a documentary or drama, image generator 112 may convert the data for the genre into a value that represents the genre. The value may be repeated such that the vector is 300 dimensions long or information may be included to pad the vector to meet the size.

For the "duration" field, image generator 112 may convert the duration of the content into a vector and may repeat the duration value such that the vector is 300 dimensions long or pad information in the vector.

At 406, image generator 112 determines if another field exists. If so, the process reiterates to 402 to retrieve another field. If not, at 408, image generator 112 may arrange the representations for the fields to form an image. For example, image generator 112 may stack all the vectors together to form an image. For example, each row of the image may be associated with a vector. Thus, if there are eight fields with an associated eight vectors, then the image may have eight rows and be the size of (300 pixels by eight pixels/width× height). Although the above process of generating the image is described, other ways may be used.

Describing each field on a row of the image may provide advantages. For example, the description information may include a long description. If the description field was transformed into ten rows of 100 pixels each, then when analyzing the image to form an encoding of the image, the process may not be able to compare the first row to row eleven, which may include information from a different field. For example, the next field after the description field starts at row eleven. Therefore, comparing row two to row one would be comparing information from the description to information from the same description. However, if each field is on a single row, comparing row two to row one will provide context between information from two different fields. Due to the process being used, the process may not compare row eleven to row one, and the context of the comparison between the two fields would be missing from the encoding of the image.

Figure 5A:
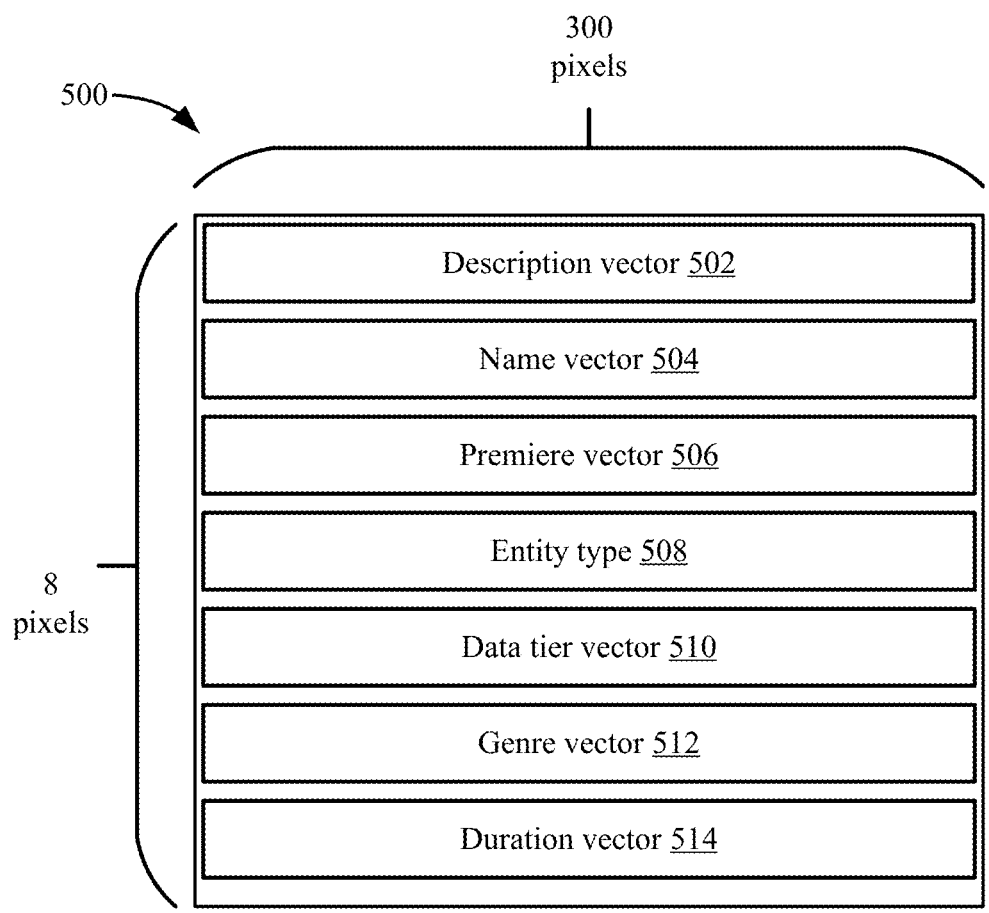
FIG. 5A shows an example of an image according to some embodiments.

FIG. 5A shows an example of an image 500 according to some embodiments. Image 500 is a simplification of an image. Image 500 includes eight rows of pixels that are 300 pixels wide. As shown, a description vector 502, a name vector 504, a premiere vector 506, an entity type vector 508, a data tier vector 510, a genre vector 512, and a duration vector 514 form image 500 in separate rows. Although not shown, each vector may be one pixel in height and 300 pixels in width.

Figure 5B:
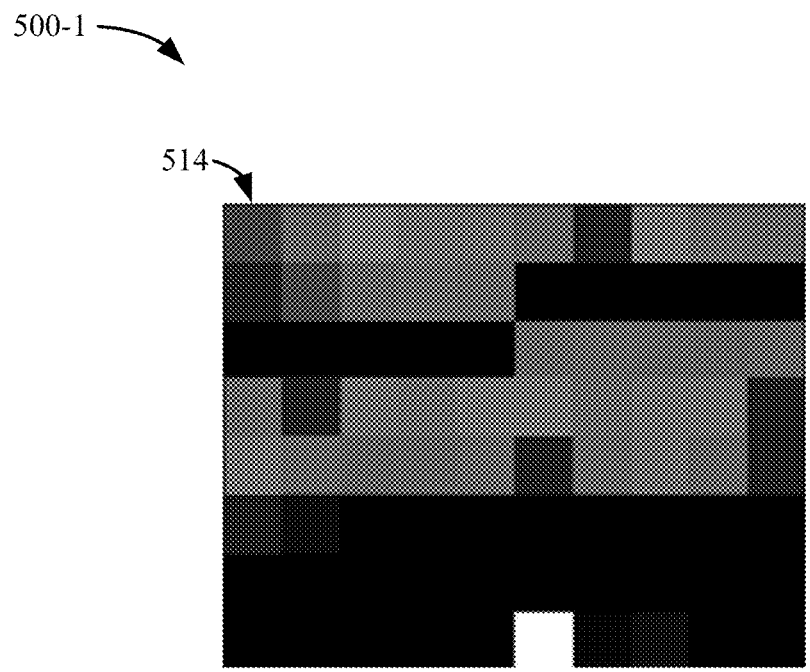
FIG. 5B and FIG. 5C depict two examples of images for different content metadata according to some embodiments.
Figure 5C:
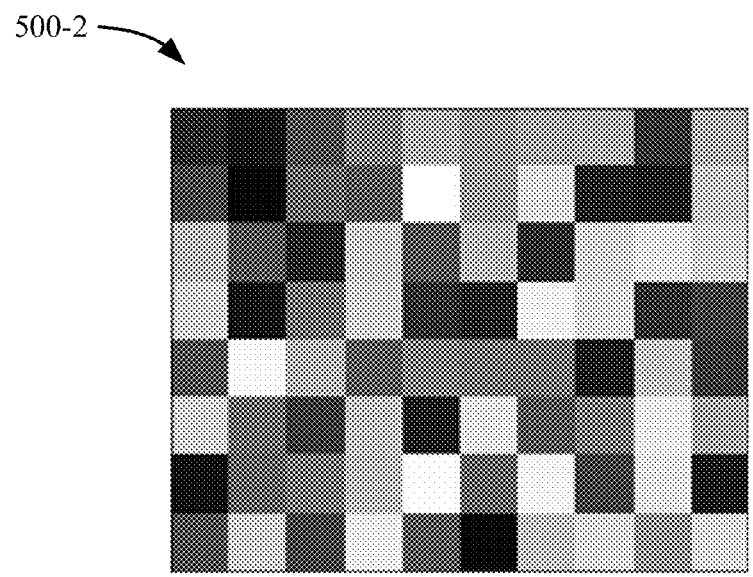

FIG. 5B and FIG. 5C depict two examples of images for different content metadata according to some embodiments. An image 500-1 may represent the content metadata and an image 500-2 may represent the candidate metadata. The values of the vectors may be converted to different grayscale values to show the differences in the images. It is noted that images 500-1 and 500-2 may be slices of the images and may not represent the true size of the images. For example, images 500-1 and 500-2 are 8 pixels in height, but do not visually show the 300 pixels in length. Each pixel may be represented by a box in images 500-1 and 500-2. For example, box 514 is a pixel in a first row, which would correspond to a first dimension for the description vector 502. Depending on the respective value for the vector, a different grayscale value is assigned to the image. As can be seen, the pixels of images 500-1 and 500-2 may be different because different values for the associated vectors are used. Image comparison network 116 may then analyze the similarity between the values of the images.

Image Comparison

Figure 6:
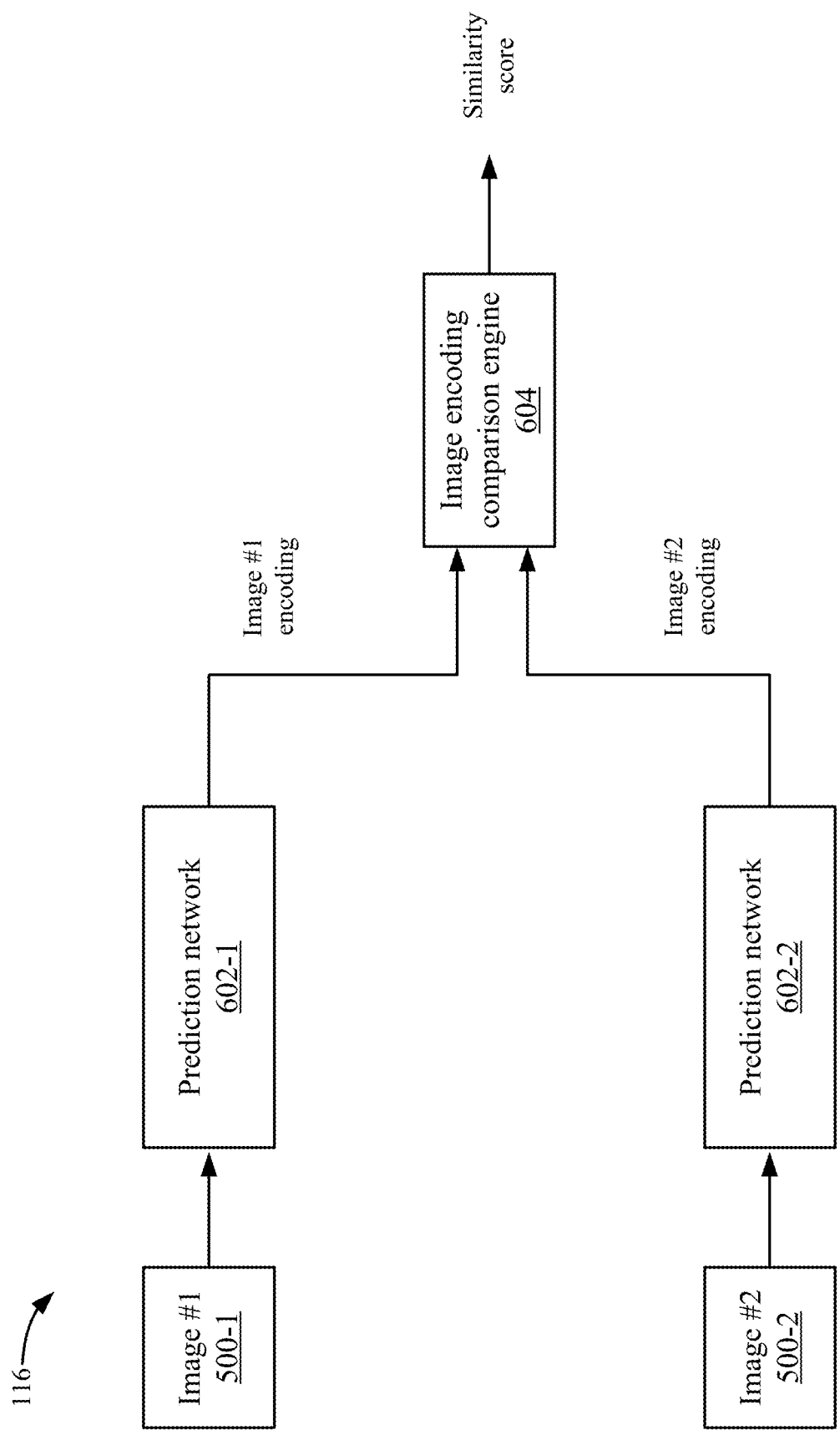
FIG. 6 depicts a more detailed example of an image comparison network according to some embodiments.

FIG. 6 depicts a more detailed example of image comparison network 116 according to some embodiments. Image comparison network 116 may include multiple prediction networks 602, or the same prediction network may be used, to analyze images. In some embodiments, a first prediction network 602-1 may analyze an image #1 500-1 and a second prediction network 602-2 may analyze an image #2 500-2. However, prediction networks 602-1 and 602-2 (collectively prediction network 602) may include the same logic.

Prediction network 602 may analyze the representation of the image to generate an encoding of the image. The encoding may be a representation of the information in the image. The encoding represents the content of the image and is in a format in which a comparison can be made with another encoding. In some embodiments, the encoding may be based on extracted information from the image. In some embodiments, the encoding is a vector that may be a column of values. Prediction network 602 attempts to understand the image to recognize content metadata bits within the image. The recognition of content metadata within the image is translated into the encoding. Accordingly, the encoding may represent which content metadata that prediction network 602 considers important to image 500. Prediction network 602-1 analyzes image #1 and outputs an image #1 encoding. Prediction network 602-2 analyzes image #2 and outputs an image #2 encoding.

Image encoding comparison engine 604 may then compare the image #1 encoding and the image #2 encoding to determine a similarity between images 500. For example, the comparison may generate a score, such as a similarity score that is a value ranking the similarity. In some embodiments, image encoding comparison engine 604 may use an absolute difference function to compare the differences between the image #1 encoding and the image #2 encoding. Then, encoding comparison engine 604 calculates the absolute value of the difference. A function, such as a sigmoid function, may generate a score from the absolute difference. The sigmoid function may convert the difference into a floating point number between a range, such as between a range of [0,1]. In some examples, a score closer to 1 indicates a high similarity between image #1 and image #2 while a score closer to 0 indicates a low similarity between image #1 and image #2. A more similar image 500-1 may have values that are more similar to image 500-2 and a less similar image 500-1 may have values that are less similar to image 500-2. For example, when using grayscale, image 500-1 may have different levels of grayscale that are different from image 500-2. The similarity score rates the differences. It will be recognized that different methods of performing the comparison and different methods of providing scores that rate the similarity of the images may be used.

Figure 7:
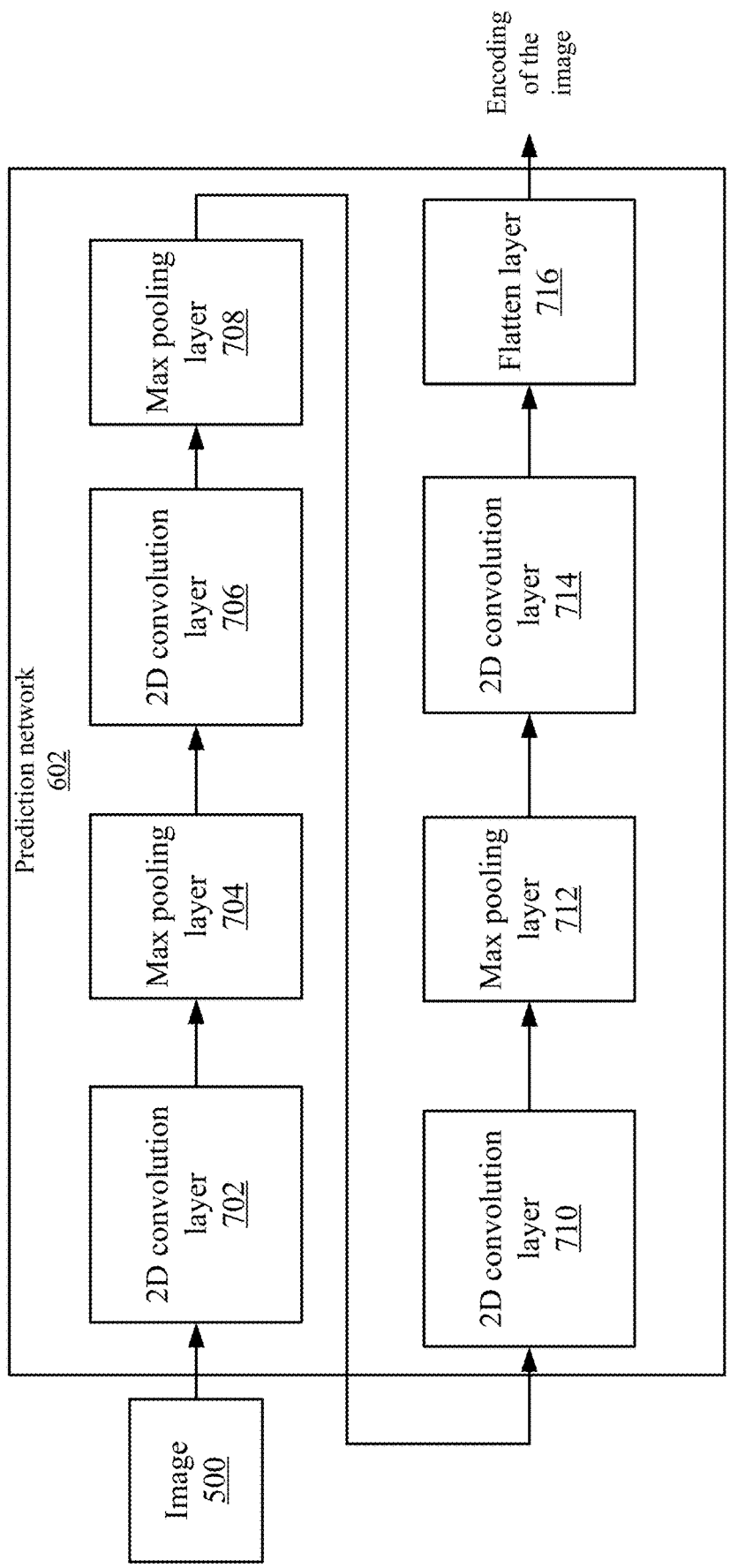
FIG. 7 depicts a more detailed example of a prediction network according to some embodiments.

FIG. 7 depicts a more detailed example of a prediction network 602 according to some embodiments. Prediction network 602 may include multiple layers that extract information from image 500. Prediction network 602 may use a network that expects a 2-dimensional input. However, text is a single dimensional sequence of characters and may not be able to use prediction network 602 as configured. Networks that analyze text may have to use other types of networks that do not analyze 2-dimensional input. Although the following structure is described, it will be understood that other structures may be used. The information that is extracted may be considered important in the image. This forms an understanding of the image to recognize content metadata bits within the image.

Prediction network 602 extract the important information by capturing characteristics of the image, such as the spatial and temporal dependencies in an image through the application of relevant filters. For example, convolution layers may be used to reduce the images to a form that is easier to process without losing features that are critical for performing a good prediction. A two-dimensional (2D) convolution layer 702 receives image 500 and reduces image 500 to a representation that may be smaller than the received image. 2D convolution layer 702 may include a number of layers and a number of kernels that are used to filter values of image 500. The kernel is a filter that filters the values of image 500 to generate a convolved feature that represents spatial and temporal dependencies of features in image 500. The convolved representation is smaller than image 500. The convolution operation may extract features, such as high-level features (e.g., edges), from image 500.

A max pooling layer 704 reduces the spatial size of the convolved representation. This may decrease the computational power required to process the data through dimensionality reduction. Also, max pooling layer 704 may extract the dominant features that are rotational and positionally variant. Max pooling returns the maximum value from the portion of the image covered by the kernel. Although max pooling is described, other types of pooling layers may be used, such as average pooling, which may take the average of values from a portion of image 500. The output of max pooling layer 704 is input into another 2D convolution layer 706, which performs the similar operations as described above to extract features of the input image. A max pooling layer 708 then performs max pooling on the output of 2D convolution layer 706. The convolution and max pooling continues using 2D convolution layer 710, max pooling layer 712, and 2D convolution layer 714. Then, a flatten layer 716 may flatten the output of 2D convolution layer 714 into a single column that is the encoding of image 500. Accordingly, prediction network 602 may reduce image 500 to an encoding that represents the important features of the image 500.

In some embodiments, the following may be used as the layers of prediction network 702, but other variations may be appreciated. 2D convolution layer 702 may include six filters of the shape (1,48). The filters may be one pixel in height and 48 pixels in length. This filter may be configured based upon the format of how image 500 was generated. For example, as was discussed above, each field was transformed into a single row of 300 pixels. Accordingly, the filter may be relatively long to capture information in the row. Typically, a filter may be two or three pixels by two or three pixels to analyze an image. However, the length of this filter is long due to the long size of image 500 that is generated and short due to one row including information for a field.

Max pooling layer 704 may include a pool size of (1,16) and a stride size of (1,8). The pool size may be the size of the kernel that is used to reduce the size of the input image and the stride size is the amount that the pool size is shifted.

2D convolution layer 706 may include 16 filters of the shape (1,24). Again, the filters are 1 pixel in height and 24 pixels in length. A longer length is still used due to the configuration of the initial image 500. The length is slightly smaller here due to the reduction in size of the input image to 2D convolution layer 706.

Max pooling layer 708 includes a pool size of (1,8) and a stride size of (1,4). The pool size and stride size are reduced slightly from the prior max pooling layer due to the smaller input image.

2D convolution layer 710 may include 32 filters of the shape (1,8). These filters are smaller than the prior used filters. Then, max pooling layer 712 may include a pool size of (1,4) and a stride size of (1,2). Then, 2D convolution layer 714 includes 64 filters of the shape (4,1) to analyze across different fields of the content metadata. For example, the height of 4 pixels analyzes across fields that are placed in separate rows.

The accuracy of prediction network 602 may rely on the data supplied to it and prediction network 602 may become more accurate as more data is analyzed. In contrast, analysis of text relies more on the manual manipulation of the design of the traditional natural language processing algorithm and less on the data that is fed into the system. Accordingly, prediction network 602 may be more accurate than an analysis of text if the manual manipulation is not correct, which may be frequent. However, the automatic increase in accuracy of prediction network 602 as more training data is added requires less manual intervention and results in more accurate results.

Entity Resolution

Figure 8:
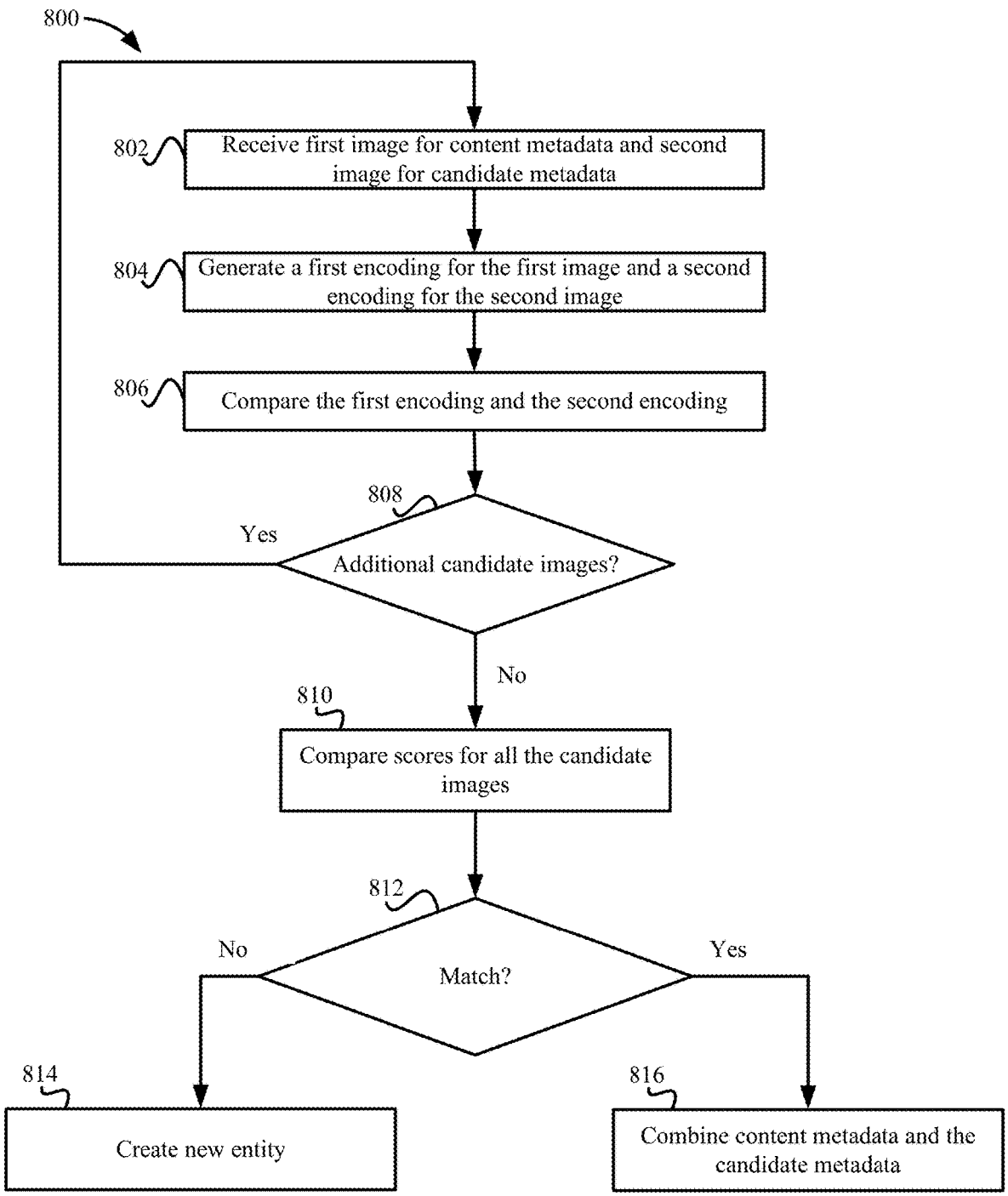
FIG. 8 depicts a simplified flowchart of a method for performing entity resolution for content metadata according to some embodiments.

FIG. 8 depicts a simplified flowchart 800 of a method for performing entity resolution for content metadata according to some embodiments. Different methods may be used to analyze the candidate images, such as comparing the candidate images in parallel. At 802, entity matcher system 104 receives a first image for content metadata and a second image for candidate metadata, such as from a candidate entity in entity database 110. As discussed above, although an entity may be compared to the content metadata, instances of content metadata may be compared.

At 804, entity matcher system 104 generates a first encoding for the first image and a second encoding for the second image. As described above, prediction network 602 may generate the first encoding and the second encoding. At 806, entity matcher system 104 compares the first encoding and the second encoding. The comparison may yield a similarity score that rates a similarity of the first image and the second image.

At 808, entity matcher system 104 determines if there are additional candidate metadata images. For example, candidate entity search 114 may have determined candidate entities that will be compared. For example, if the content metadata is for a movie, candidate entity search 114 may determine candidate entities for movies and not television shows. This is because the content metadata may not be associated with an entity for a television show since it is a movie.

If additional candidate images exist, then the process reiterates to 802 to determine a second image for the additional candidate image. The original first image for the content metadata is still used in the comparison.

If there are not any additional candidate images, at 810, entity matcher system 104 compares the scores for all the candidate images. For example, a candidate image #1 may have a score of 0.05, candidate image #2 may have a score of 0.10, and a candidate image #3 may have a score of 0.99. The value of the score indicates the similarity of candidate metadata to the content metadata. At 812, entity matcher system 104 determines if there is a match of the content metadata. In some embodiments, entity matcher system 104 may require that the score be above a threshold. For example, if all the scores are below the threshold, then it is possible that the content metadata does not match any candidate metadata. However, if there is at least one score above the threshold, then there may be a match. Then, entity matcher system 104 may select the candidate image that has the highest score that is over the threshold. Selecting the candidate image with the highest score selects the candidate metadata that is the most similar to the content metadata. For example, candidate image #3 has a similarity score that is above a threshold of 0.90 and is the highest score among the candidate images.

If there is not a match, then at 814, entity matcher system 104 creates a new entity for the content metadata. For example, the new entity may be stored in entity database 110 with the information from the content metadata.

If there is a match, at 816, entity matcher system 104 combines the content metadata with the candidate metadata in entity database 110. For example, the content metadata may be added to existing metadata for the candidate entity. In other examples, the content metadata may be used to supplement metadata in the candidate entity. In other examples, instances of content metadata may be combined to form a new entity in entity database 110.

Conclusion

By converting content metadata to images and comparing the images to images for candidate entities, the comparison process may be simplified. For example, the prediction network that is used to perform the comparisons may be based on comparing images rather than text, which reduces the possible variations that need to be trained. The comparison process may be simpler and more accurate than comparing the possible variations that can be found in text. A prediction network may more easily extract the important features of an image to make the comparison between images compared to extracting information from text. The training process may also be simplified when training a network to determine similarity of images. Accordingly, the process for determining a matching entity for content metadata is simplified and more accurate by using images.

Example Embodiments

In some embodiments, a method comprising: receiving, by a computing device, a first textual description of content; converting, by the computing device, the first textual description of content to a first image representation; comparing, by the computing device, a similarity between the first image representation and a second image representation for candidate metadata, wherein the candidate metadata is associated with a second textual description of content; and determining, by the computing device, whether the first textual description of content is associated with the second textual description of content based on the comparison of similarity of the first image representation and the second image representation.

In some embodiments, the first textual description of content is metadata for the content.

In some embodiments, the first textual description of content is received from a different source than the second textual description of content.

In some embodiments, converting the first textual description of content to the first image representation comprises: transforming the first textual description to a unified format, wherein the unified format is used to generate the first image representation and the second image representation.

In some embodiments, converting the first textual description of content to the first image representation comprises: transforming information from the first textual description of content to a defined set of fields.

In some embodiments, converting the first textual description to the first image representation comprises: transforming the defined set of fields to the first image representation.

In some embodiments, converting the first textual description of content to the first image representation comprises: transforming a field to a representation for the first image representation.

In some embodiments, converting the first textual description of content to the first image representation comprises: transforming each of the set of fields to a representation for a portion of first image representation.

In some embodiments, each representation for the set of fields is a row in the first image representation.

In some embodiments, comparing the similarity between the first image representation and the second image representation comprises: generating a first encoding for the first image representation using a prediction network; generating a second encoding for the second image representation using the prediction network; and comparing the first encoding and the second encoding.

In some embodiments, comparing the similarity between the first image representation and the second image representation comprises: recognizing features in the first image representation using facial recognition to generate a first encoding; recognizing features in the second image representation using facial recognition to generate a second encoding; and comparing the first encoding to the second encoding.

In some embodiments, determining whether the first textual description of content is associated with the second textual description of content comprises: determining whether a first score of similarity between the first image representation and the second image representation is greater than a second score of similarity for other candidate metadata, wherein the first image representation is compared to a third image representation for the other candidate metadata to generate the second score of similarity; and determining whether the first score and the second score indicate the first image representation is more similar to the second image representation than the third image representation.

In some embodiments, determining whether the first textual description of content is associated with the second textual description of content comprises: determining whether a score of similarity is greater than a threshold.

In some embodiments, the method further comprising: adding at least a portion of the first textual description of content to the second textual description of content.

In some embodiments, the first textual description of content is directed to a same content entity as the second textual description of content.

In some embodiments, a non-transitory computer-readable storage medium containing instructions, that when executed, control a computer system to be operable for: receiving a first textual description of content; converting the first textual description of content to a first image representation; comparing a similarity between the first image representation and a second image representation for candidate metadata, wherein the candidate metadata is associated with a second textual description of content; and determining whether the first textual description of content is associated with the second textual description of content based on the comparison of similarity of the first image representation and the second image representation.

In some embodiments, comparing the similarity between the first image representation and the second image representation comprises: generating a first encoding for the first image representation using a prediction network; generating a second encoding for the second image representation using the prediction network; and comparing the first encoding and the second encoding.

In some embodiments, comparing the similarity between the first image representation and the second image representation comprises: recognizing features in the first image representation using facial recognition to generate a first encoding; recognizing features in the second image representation using facial recognition to generate a second encoding; and comparing the first encoding to the second encoding.

In some embodiments, wherein determining whether the first textual description of content is associated with the second textual description of content comprises: determining whether a first score of similarity between the first image representation and the second image representation is greater than a second score of similarity for other candidate metadata, wherein the first image representation is compared to a third image representation for the other candidate metadata to generate the second score of similarity; and determining whether the first score and the second score indicate the first image representation is more similar to the second image representation than the third image representation.

Figure 9:
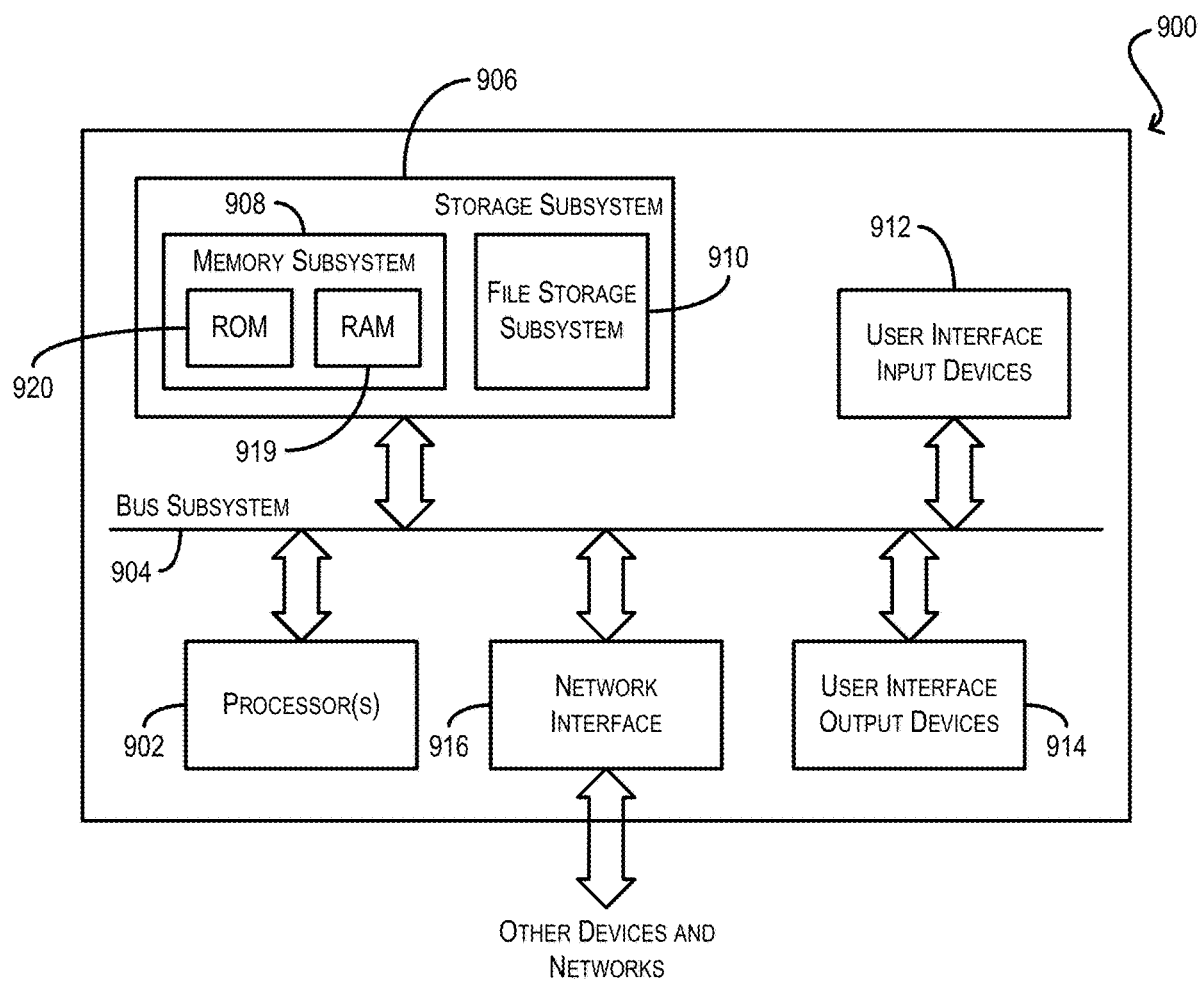
FIG. 9 depicts an example computer system according to some embodiments.

In some embodiments, an apparatus comprising: one or more computer processors; and a non-transitory computer-readable storage medium comprising instructions, that when executed, control the one or more computer processors to be operable for: receiving a first textual description of content; converting the first textual description of content to a first image representation; comparing a similarity between the first image representation and a second image representation for candidate metadata, wherein the candidate metadata is associated with a second textual description of content; and determining whether the first textual description of content is associated with the second textual description of content based on the comparison of similarity of the first image representation and the second image representation System FIG. 9 depicts an example computer system 900 according to some embodiments. Computer system 900 can be used to implement any of the computing devices, systems, or servers described in the foregoing disclosure. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple buses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a first textual description of content;
   converting, by the computing device, the first textual description of content to a first image representation;
   comparing, by the computing device, a similarity between the first image representation and a second image representation for candidate metadata, wherein the candidate metadata is associated with a second textual description of content; and
   determining, by the computing device, whether the first textual description of content is associated with the second textual description of content based on the comparison of similarity of the first image representation and the second image representation.

2. The method of claim 1, wherein the first textual description of content is metadata for the content.

3. The method of claim 1, wherein the first textual description of content is received from a different source than the second textual description of content.

4. The method of claim 1, wherein converting the first textual description of content to the first image representation comprises:
   transforming the first textual description to a unified format, wherein the unified format is used to generate the first image representation and the second image representation.

5. The method of claim 1, wherein converting the first textual description of content to the first image representation comprises:
   transforming information from the first textual description of content to a defined set of fields.

6. The method of claim 5, wherein converting the first textual description to the first image representation comprises:
   transforming the defined set of fields to the first image representation.

7. The method of claim 5, wherein converting the first textual description of content to the first image representation comprises:
   transforming a field to a representation for the first image representation.

8. The method of claim 7, wherein converting the first textual description of content to the first image representation comprises:
   transforming each of the set of fields to a representation for a portion of first image representation.

9. The method of claim 8, wherein each representation for the set of fields is a row in the first image representation.

10. The method of claim 1, wherein comparing the similarity between the first image representation and the second image representation comprises:
    generating a first encoding for the first image representation using a prediction network;
    generating a second encoding for the second image representation using the prediction network; and
    comparing the first encoding and the second encoding.

11. The method of claim 1, wherein comparing the similarity between the first image representation and the second image representation comprises:
    recognizing features in the first image representation using facial recognition to generate a first encoding;
    recognizing features in the second image representation using facial recognition to generate a second encoding; and
    comparing the first encoding to the second encoding.

12. The method of claim 1, wherein determining whether the first textual description of content is associated with the second textual description of content comprises:
    determining whether a first score of similarity between the first image representation and the second image representation is greater than a second score of similarity for other candidate metadata, wherein the first image representation is compared to a third image representation for the other candidate metadata to generate the second score of similarity; and
    determining whether the first score and the second score indicate the first image representation is more similar to the second image representation than the third image representation.

13. The method of claim 1, wherein determining whether the first textual description of content is associated with the second textual description of content comprises:
    determining whether a score of similarity is greater than a threshold.

14. The method of claim 1, further comprising:
    adding at least a portion of the first textual description of content to the second textual description of content.

15. The method of claim 1, wherein the first textual description of content is directed to a same content entity as the second textual description of content.

16. A non-transitory computer-readable storage medium containing instructions, that when executed, control a computer system to be operable for:
    receiving a first textual description of content;
    converting the first textual description of content to a first image representation;
    comparing a similarity between the first image representation and a second image representation for candidate metadata, wherein the candidate metadata is associated with a second textual description of content; and
    determining whether the first textual description of content is associated with the second textual description of content based on the comparison of similarity of the first image representation and the second image representation.

17. The non-transitory computer-readable storage medium of claim 16, wherein comparing the similarity between the first image representation and the second image representation comprises:
   generating a first encoding for the first image representation using a prediction network;
   generating a second encoding for the second image representation using the prediction network; and
   comparing the first encoding and the second encoding.

18. The non-transitory computer-readable storage medium of claim 16, wherein comparing the similarity between the first image representation and the second image representation comprises:
   recognizing features in the first image representation using facial recognition to generate a first encoding;
   recognizing features in the second image representation using facial recognition to generate a second encoding; and
   comparing the first encoding to the second encoding.

19. The non-transitory computer-readable storage medium of claim 16, wherein determining whether the first textual description of content is associated with the second textual description of content comprises:
   determining whether a first score of similarity between the first image representation and the second image representation is greater than a second score of similarity for other candidate metadata, wherein the first image representation is compared to a third image representation for the other candidate metadata to generate the second score of similarity; and
   determining whether the first score and the second score indicate the first image representation is more similar to the second image representation than the third image representation.

20. An apparatus comprising:
   one or more computer processors; and
   a non-transitory computer-readable storage medium comprising instructions, that when executed, control the one or more computer processors to be operable for:
   receiving a first textual description of content;
   converting the first textual description of content to a first image representation;
   comparing a similarity between the first image representation and a second image representation for candidate metadata, wherein the candidate metadata is associated with a second textual description of content; and
   determining whether the first textual description of content is associated with the second textual description of content based on the comparison of similarity of the first image representation and the second image representation.

* * * * *